UNITED STATES PATENT OFFICE.

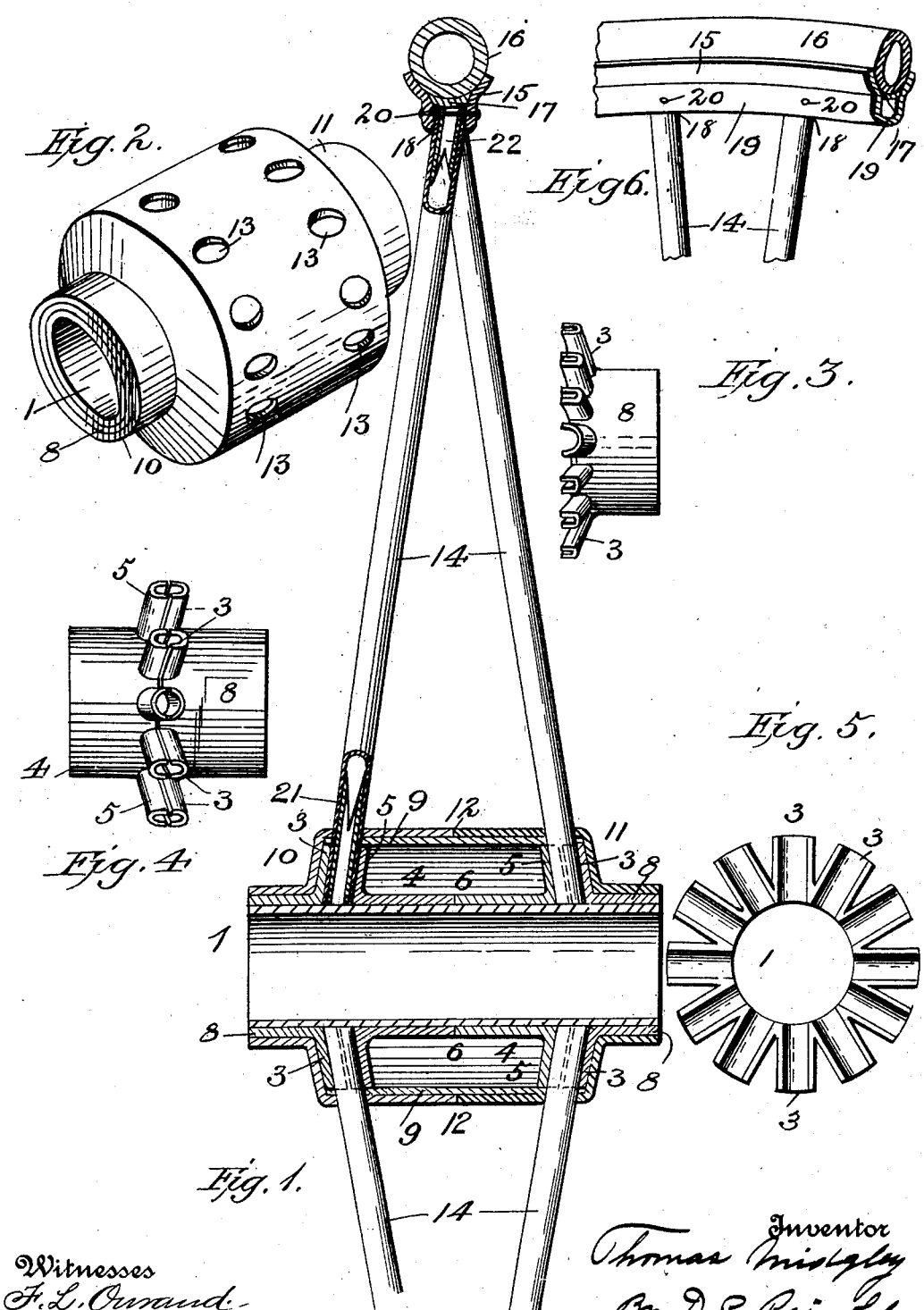

THOMAS MIDGLEY, OF COLUMBUS, OHIO.

METALLIC VEHICLE-WHEEL.

SPECIFICATION forming part of Letters Patent No. 660,729, dated October 30, 1900.

Application filed July 9, 1900. Serial No. 22,978. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Vehicle-Wheels; and I do hereby declare the following to be a full, clear, and exact description of the invention, such as will enable others skilled in the art to which it appertains to make and use the same.

My invention relates to vehicle-wheels, has especial reference to that class known as metallic wheels, and consists in certain improvements in construction, whereby the several parts of the wheel are joined together without screw-threads, as will be fully disclosed in the following specification and claims.

In the accompanying drawings, which form part of this specification, Figure 1 represents a vertical longitudinal section of a wheel, the spokes being shown in elevation; Fig. 2, a perspective of the hub of the wheel; Fig. 3, a side view of one of the end sections of the hub; Fig. 4, a like view of two of the sections of the hub; Fig. 5, an end view of one of the sections; and Fig. 6, a side elevation, partly in perspective, showing part of the rim, the tire, and the spokes in the rim.

Reference being had to the drawings and the numerals thereon, 1 indicates the inner tubular section of the hub, upon which are mounted concentric sections 2, one at each end, provided with tubular spoke-sockets 3, and between said sections are sections 4, provided with like tubular spoke-sockets 5, the adjacent ends of the sections 4 meeting in the longitudinal center of the hub and forming a butt-joint 6, and the necks 8 of the sections 2 extend to the end of the hub, as shown in Fig. 1, and the inner sections 4 are surrounded by a concentric tubular section 9, with its ends resting upon the tubular spoke-sockets 5, and all of said sections are surrounded by a hub-casing 7, made in two parts or sections 10 and 11, which are exact counterparts of each other and meet in the longitudinal center of the hub and form a butt-joint 12 and are each provided with holes or openings 13 to receive the tubular spokes 14.

It will be observed that the section 9 serves to stiffen the hub and impart rigidity thereto by crossing the joints 6 and 12 and that the outer sections 10 and 11 fit closely upon the sections 2 and 9 to form a homogeneous body when the several parts of the hub are metallically joined together by brazing or soldering.

15 indicates the rim of the wheel, in which the tire 16 is seated, and is provided with a plate 17 between the sides of the rim to form a continuous semicircular seat in cross-section for the tire and to stiffen the rim, and is metallically joined, brazed, or soldered to the sides of the rim, and the spokes 14 enter holes 18 in the channel 19 of the rim and are metallically secured therein, they each being connected to the channel 19 by a pin 20 to hold them in position until they are brazed or soldered to the rim.

The spokes 14 are provided at each end with tubular reinforces, such as 21 at the inner end and 22 at the outer end, to stiffen the spokes, and the inner ends of the spokes extend through the spoke-sockets and rest upon the inner section 1 of the hub, which takes the thrust of the spokes, and the outer ends of the spokes extend through the channel 19 and bear against the plate 17 of the rim, as shown in Fig. 1.

The parts of the hub having been assembled, the spokes set in the hub, and the rim applied to the outer end of the spokes, the wheel is immersed in a bath of molten metal, preferably brass, and all the parts joined together by the molten metal entering the joints or seams of the hub or felly, brazing or soldering the joints or seams and forming a compact and durable wheel.

The brazing or soldering alloy is maintained at a temperature to keep it in a molten state and to prevent its being chilled by the articles immersed in the bath for brazing or soldering, and the flux lying upon the surface of the metal is maintained at the temperature of the metal by contact therewith. The wheel is immersed through the flux into the molten metal and allowed to remain long enough for the metal to penetrate and fill all the joints and seams of the wheel, when it is slowly drawn out of the bath and the excess of metal is stripped off by the flux.

Having thus fully described my invention, what I claim is—

1. A metallic vehicle-wheel having a hub composed of an inner tubular section, sections mounted thereon and provided with tubular spoke-sockets, and an outer casing, the several parts metallically joined, brazed or soldered together.

2. A metallic vehicle-wheel having a hub composed of an inner tubular section, sections mounted thereon and provided with spoke-sockets, an outer casing, and a concentric section surrounding part of the sections having the spoke-sockets, the several parts metallically joined, brazed or soldered together.

3. A metallic vehicle-wheel having a hub composed of an inner tubular section, sections mounted thereon and provided with spoke-sockets and butt-joints at their adjacent ends, and a casing provided with a butt-joint at its adjacent ends, the several parts metallically joined, brazed or soldered together.

4. A metallic vehicle-wheel having a hub composed of an inner tubular section, a concentric section provided with tubular spoke-sockets, and an outer casing in combination with spokes extending through the sockets and resting upon the inner section.

5. A metallic vehicle-wheel provided with a rim having a channel on its inner side provided with spoke-holes, a plate between the sides of the rim and brazed or soldered thereto, and spokes soldered to the rim.

In testimony whereof I affix my signature in presence of two witnesses.

THOMAS MIDGLEY.

Witnesses:
JOHN R. YOUNG,
A. S. BRYANT.